United States Patent [19]

Cole et al.

[11] Patent Number: 4,681,929

[45] Date of Patent: * Jul. 21, 1987

[54] USE OF RUBBER SOLVENT-RESIN SOLVENT AND MISCELLA MIXTURES FOR EXTRACTION-EXPRESSION OF RUBBER AND RESINS FROM GUAYULE SHRUB

[75] Inventors: William M. Cole, Norton; Steven L. Fenske, Uniontown, both of Ohio; David J. Serbin, Springfield, Va.; Shrikant R. Malani, Akron, Ohio; Frank J. Clark, Massillon, Ohio; Joanne L. Beattie, Uniontown, Ohio

[73] Assignee: The Firestone Tire & Rubber Company, Akron, Ohio

[*] Notice: The portion of the term of this patent subsequent to May 27, 2003 has been disclaimed.

[21] Appl. No.: 728,366

[22] Filed: Apr. 29, 1985

[51] Int. Cl.$^4$ .............................................. C08C 1/04
[52] U.S. Cl. ..................... 528/493; 528/494; 528/495; 528/498; 528/930; 528/933; 528/502
[58] Field of Search ............... 528/930, 498, 493, 494, 528/495, 931, 933, 502; 523/332; 241/DIG. 31; 47/10

[56] References Cited

U.S. PATENT DOCUMENTS

| 1,671,570 | 5/1928 | Carnahan | 528/930 |
|---|---|---|---|
| 2,281,336 | 4/1942 | Stachom | 528/930 |
| 2,459,369 | 1/1949 | Tint et al. | 528/930 |
| 4,136,131 | 1/1979 | Buchanan | 528/497 |
| 4,405,532 | 9/1983 | Gutierrez et al. | 528/930 |
| 4,435,337 | 3/1984 | Kay et al. | 528/930 |
| 4,530,995 | 7/1985 | Gutierrez et al. | 528/930 |
| 4,591,631 | 5/1986 | Beattie et al. | 528/930 |

FOREIGN PATENT DOCUMENTS 0039910 11/1981 European Pat. Off. ............ 528/930

OTHER PUBLICATIONS

"Hackh's Chemical Dictionary", J. Grant (ed.), Mc--Graw-Hill, Inc., N.Y. (1969), pp. 578-579.

*Primary Examiner*—Joseph L. Schofer
*Assistant Examiner*—F. M. Teskin
*Attorney, Agent, or Firm*—D. N. Hall

[57] ABSTRACT

A process for extracting resin and rubber from guayule plants utilizing a portion of recycled miscella and a fresh solvent system. An expression step is applied to the plants to enhance recovery of resin and rubber extract. The solvent system is preferably an organic polar solvent and a hydrocarbon solvent for rubber for simultaneous resin and rubber extraction containing at least 50% by weight of the hydrocarbon solvent. The process can be a one-step method wherein resin and rubber are generally simultaneously extracted.

9 Claims, 2 Drawing Figures

USE OF RUBBER SOLVENT-RESIN SOLVENT AND MISCELLA MIXTURES FOR EXTRACTION-EXPRESSION OF RUBBER AND RESINS FROM GUAYULE SHRUB

BACKGROUND OF THE INVENTION

The present invention relates to a resin or a resin-rubber extraction process utilizing recycled miscella and expression of guayule plants. The process can either be one-step or two-step depending upon simultaneous recovery of both resin and rubber or separate recovery thereof.

U.S. Pat. No. 1,671,570 relates to crushing guayule shrub as in a tube mill. Water is then added and the guayule material and water are violently agitated by means of air, followed by separating the rubber particles lighter than water by floatation, heating said rubber particles and subjecting to water pressure and separating the rubber from the remaining particles by scrubbing and floatation. As such, this patent lacks any suggestion of applicants' use of any recycled miscella or subjecting the plant material to at least one expression. Also, it does not recover rubber by solvent extraction.

U.S. Pat. No. 2,281,336 relates to subjecting guayule plants to extremely high pressure as from about 5000 to about 100,000 pounds per linear inch of with thereby separating a fluid fraction therefrom and purifying the resulting emulsion with a non-rubber solvent such as acetone. This patent also fails to teach or suggest any utilization of recycling miscella as well as solvent extraction of rubber from guayule shrubs.

U.S. Pat. No. 4,435,337 relates to a process of drying guayule plant material to a moisture content of from about 5 to about 25%, deresignating the plant material with an anhydrous oxygenated organic solvent and recovering the rubber, water-solubles and the like by water flotation. As such, this patent fails to teach recycling of the portion of the miscella to the guayule plants as well as solvent extraction of rubber from guayule shrubs.

DISCLOSURE OF THE INVENTION

It is therefore an aspect of the present invention to provide a process for separating resin or resin and rubber from guayule plants.

It is another aspect of the present invention to separate resin or resin and rubber from guayule plants, as above, wherein a portion of the miscella is utilized to extract said resin or said resin and rubber.

It is a further aspect of the present invention to separate resin or resin and rubber from guayule plants, as above, wherein said plant are subjected to at least one expression.

It is yet another aspect of the present invention to separate resin and rubber from guayule plants simultaneously, as above, wherein the viscosity of said miscella is usually lower than the viscosity of rubber alone at a similar concentration in a non-polar solvent.

It is a still further aspect of the present invention to separate resin or resin and rubber from guayule plants, as above, wherein an increased yield is obtained.

It is still another aspect of the present invention to separate resin or resin and rubber from guayule plants, as above, wherein increased temperature is utilized to effect a faster extraction rate.

These and other aspects of the present invention will become apparent from the followig specification.

In general, a process for extracting at least resin from guayule plants, comprises the steps of:
adding a portion of a recycled miscella solvent system to prepared guayule plants;
extracting at least resin from said guayule plants, and conducting at least one expression on said guayule plants.

BEST MODE FOR CARRYING OUT THE INVENTION

Figure 1:
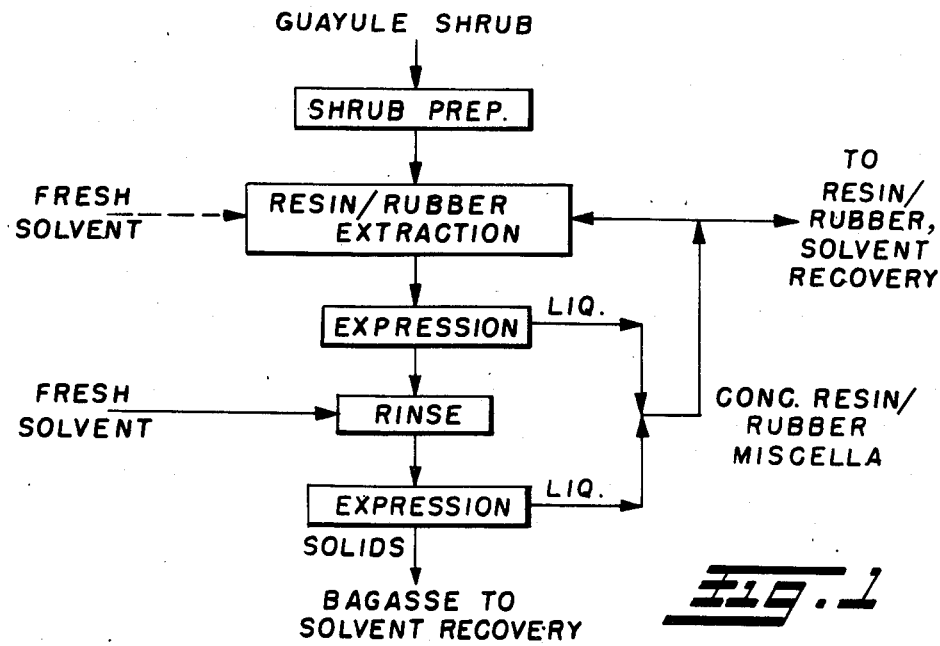
FIG. 1 is a block diagram of a one-step process according to the present invention.

Guayule plants are harvested in a conventional manner and as such can contain anywhere from about 0 to about 60% moisture by weight. Plant preparation for the present invention involves utilization of any conventional process to rupture the cells. For example, the shrubs are initially shaken to remove any loose dirt and then fed whole to a hammermill where they are shreaded to a particle size of approximately one-inch or less. Alternately, the leaves can be removed before or after shredding. Other grinding or crushing apparatus or techniques can also be utilized. The crushed plants are treated in accordance with the present invention utilizing a portion of recycled miscella and at least one expression step to remove at least the resin and preferably the resin and rubber. Generally one of the two processes can be utilized, a so-called one-step process wherein the resin and rubber are generally simultaneously extracted or a so-called two-step process wherein the resin is first extracted and then the rubber is extracted.

Considering the one-step process, the crushed plants are added to any conventional extraction equipment as for example, an immersion extractor, a percolation apparatus, a static mixer, or similar type for either a batch or a continuous operation. In order to effect simultaneous extraction of the resin and the rubber, a solvent system is utilized having from about 50% to about 95% by weight of a hydrocarbon solvent, desirably from about 55 to about 90% by weight, preferably from about 60 to about 85% by weight, and highly preferred from about 65% to about 80% by weight. The remaining portion of the solvent system is made up of a polar solvent, that is from about 5% to 50% by weight, desirably from about 10% to about 45% by weight, preferably from about 15% to about 40% by weight, and highly preferred from about 20% to about 35% by weight. The hydrocarbon solvent largely dissolves the rubber portion and can be an alkane having from 4 to 9 carbon atoms such as heptane, nonane, and the like with hexane or pentane being preferred. Cycloalkanes having from 5 to 10 carbon atoms can also be utilized such as cyclohexane, cyclopentane, and the like. Aromatic solvents or alkyl substituted aromatic solvents having from 6 to 12 carbon atoms can also be utilized as for example, benzene, xylene, toluene and the like. The organic polar solvent can be an alcohol having from 1 to 8 carbon atoms such as ethanol, isopropanol and the like. Esters having from 3 to 8 carbon atoms can also be utilized such as the various formates, the various acetates, the various propionates and the like. Another group of suitable organic polar solvents includes the ketones having from 3 to 8 carbon atoms such as acetone, methyl ethyl ketone and the like. Ethers having from 2 to 8 carbon atoms such as dimethyl ether, diethyl ether and the like can also be utilized. Another group of polar solvents are the cyclic ethers having from 4 to 8 carbon atoms such as tetrahydrofuran. The utilization of a hydrocarbon solvent and a polar solvent in the amount set forth above generally results in a monophase solvent at the extraction temperature; in other words the constituent solvents are miscible at the operating conditions. Although a two-phase solvent system can be utilized with regard to the one-step process, that is, contain different amounts of a polar and a hydrocarbon solvent, such is usually not desired.

A representative block diagram of a one-step process is shown in FIG. 1. As apparent from FIG. 1, a small amount of fresh solvent, which is generally the same as the above monophase solvent can be added to the extraction apparatus. The majority amount of solvent added to the ruptured guayule plants is in the form of recycled miscella. Generally, miscella is made up of a solvent system similar or identical to the fresh solvent system except that it contains extracted resin and rubber therein along with any water extracted from the plants. Oftentime, the selection of the solvent system or the monophase solvent system and the ensuing miscella solvent system generated thereby is governed by the praticality of recovering the solvents from the miscellla. The miscella can contain from 0 to 50% by weight of rubber and resin therein and is usually limited only by its viscosity characteristics. The amount of miscella recycled to the plants is generally at least 50% by weight, desirably at least 70% by weight, and preferably at least 90% by weight. The remaining non-recycled miscella is treated in any conventional manner to recover the resin and rubber therefrom. The plants containing the recycled miscella are then subjected to any conventional expression apparatus such as a centrifuge, a screw press, an extruder and the like. During expression, miscella is released and fed to the holding tank. According to the present invention, any number of expression steps can be utilized to achieve the desired recovery of resin and rubber. As an approximate rule of thumb, the combined extraction and one expression steps will generally remove approximately 70% by weight of the resin and rubber content of the guayule plant depending on the efficiency of the expression. Any subsequent rinsing and expression step will similarly remove approximately 70% of the remaining rubber, resin and solvent content. Hence, the number of expression steps is generally dependent upon the recovery yield desired and the equipment used for expression.

As apparent from FIG. 1, an additional expression step is utilized wherein a fresh solvent system such as that set forth above, and preferably a monophase solvent system identical to the initial fresh solvent added to the extractor, is added to the guayule plants for purposes of rinsing, followed by expression of the plant material. The solvent obtained from the rinsing operation as well as the expression operation is also fed to the holding tank. The bagasse is treated to recover any remaining solvent which can also be fed to the holding tank.

At any point during the process, antioxidants can be added to preserve the resin and rubber. Typically, from about 1 to about 5 parts per 100 parts by weight of rubber within the miscella or guayule plant is added with from about 2 to 3 parts being preferred. The antioxidants can be any conventional antioxidant well known to the art and the literature with specific examples including phenylene diamine, N-(1,3-dimethylbutyl)-N'-phenyl-p-phenylenediamine, commonly known as Santoflex 13, and the like.

The simultaneous recovery of the resin or rubber can be according to a batch process wherein a desired amount of crushed guayule plants is added and the extraction process carried out for a predetermined amount of time until a desired recovery has been achieved. At that point in time, the extraction is terminated and the miscella collected in the holding tank can be separated with regard to rubber and resin according to various conventional techniques. Should, however, a continuous process be utilized, the guayule plants can be continuously added and a portion of the miscella from the holding tank continuously withdrawn and treated in accordance with conventional methods to recover the resin and rubber therein.

The temperature of the process can generally vary from ambient, that is, from approximately 15° C. up to about 75° C. so as to achieve a faster extraction rate. In fact, the temperature can be optimized for each step so as to achieve maximum efficiency.

Although a particular process has been described with regard to the simultaneous extraction of rubber and resin as set forth in FIG. 1 in accordance with the present invention, variations thereof as well as other methods can be utilized. The important aspect is that portion of the miscella by recycled and utilized as the extractant and at least one or more expression steps be utilized.

Figure 2:
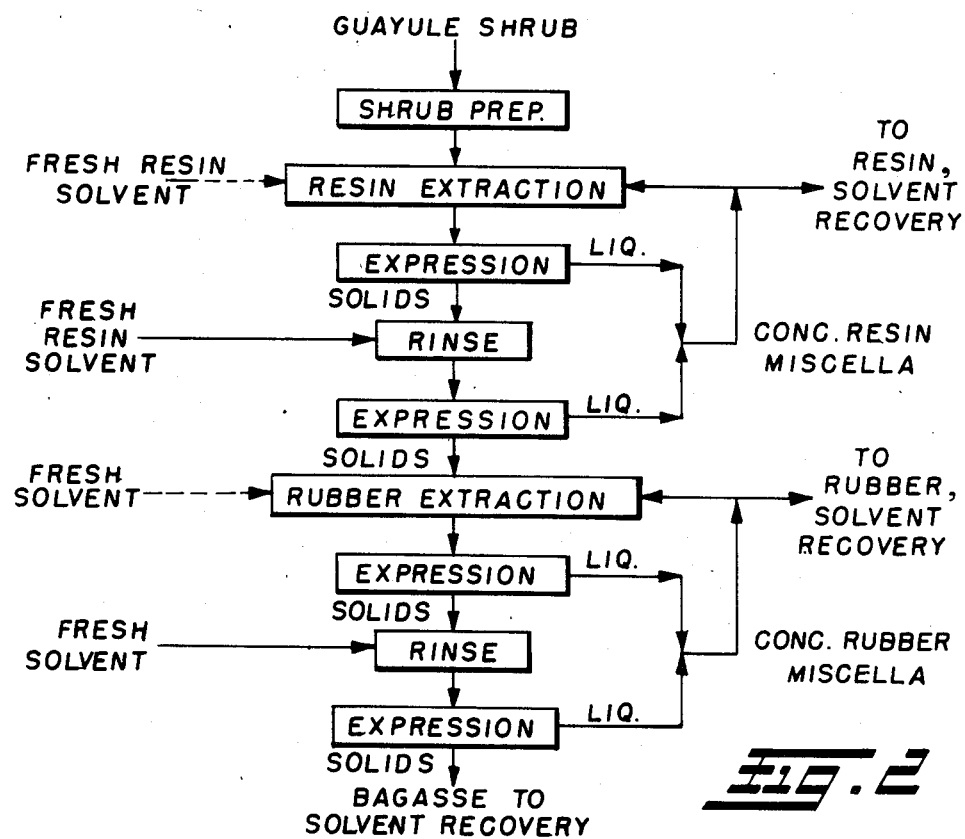
FIG. 2 is a block diagram of a two-step process according to the present invention.

Considering now the two-step process, reference is made to FIG. 2 which is exemplary of such a typical process. The two-step process is essentially identical to the one-step process except that rather than to simultaneously extract both the resin and rubber, the resin fraction is first extracted and the guayule plants then fed to the rubber extraction stage. Thus, in the first stage of the two-step process, the guayule plants, prepared in the manner as set forth above to rupture the cells, are fed to a resin extraction apparatus wherein one or more fresh polar solvents as described above can be added along with resin miscella containing essentially one or more polar solvents therein which are usually the same as the fresh polar solvents. That is, only polar solvents are generally utilized in the first stage. As shown in FIG. 2, the resin is extracted by the initially added fresh solvent as well as the recycled resin miscella, is then subjected to expression, rinsed with one or more fresh polar solvents and expressed once again. The various liquid streams from the first expression, the rinse as well as the second expression are fed to a holding tank (not shown) from which the majority is recycled to the extraction apparatus. Once again, at least 50%, desirably at least 70% and preferably 90% or greater of the liquid in the holding tank is recycled. The remaining portion is subjected to standard resin and solvent recovery techniques. Generally, all other aspects of the first step are the same as the one-step process including the temperature, and the like. Regardless of whether a batch or a continuous process is utilized, the guayule plants are then fed to the second stage rubber extractor apparatus wherein one or more fresh hydrocarbon solvents as described above can be fed along with recycled rubber miscella. The rubber miscella also essentially contains one or more hydrocarbon solvents, which are usually the same as the fresh hydrocarbon solvents, plus rubber therein. Alternatively, the monophase solvent can be added as fresh solvent as well as be contained in the miscella. At least one expression step is conducted although as shown in FIG. 2, a rinse step applied wherein one or more fresh hydrocarbon solvents or a monophase solvent are added, followed by another expression step. The various liquid streams as from the first and second expression step as well as the rinse can be fed to a miscella holding tank wherein most of the miscella is recycled and a small amount thereof is separated with the rubber and solvent recovered by conventional techniques. The treated guayule plant bagasse is then further subjected to solvent recovery. Various aspects of the second step are generally the same as the one-step process including the temperature, pressure, and the like.

Although the second stage can utilize only a hydrocarbon solvent, the monophase solvent is often utilized to obtain a lower solution viscosity which aids in pumting requirements, energy savings and the like.

The invention will be better understood by reference to the following examples.

EXAMPLE I

Conventional Treatment (Control)

15%/85% Methyl alcohol/hexane and 4.32 pounds of guayule shrub were charged to a percolation extraction column. 8.0 Pounds of 15%/85% methyl alcohol/hexane at 110° F. were percolated through the shrub bed for 1.25 hours and allowed to drain by gravity. The resulting miscella contained 34.9 grams or 64.4% of the available rubber and 62.8 grams or 46.2% of the available resin. Three rinses of 4.0 pounds of 15%/85% methyl alcohol/hexane were each percolated through the shrub bed for 0.5 hours and allowed to drain by gravity. After these rinses, 49.7 grams or 93.3% of the available rubber and 121.0 grams or 89.0% of the available resin were removed from the shrub.

EXAMPLE II

Percolation Extraction Using 15%/85% Methyl Alcohol/Hexane Incorporating Expression or Squeezing Step 4.32 Pounds of guayule shrub were charged to a percolation extraction column. 8.0 pounds of 15%/85% methyl alcohol/hexane at 110° F. were percolated through the shrub bed for 1.25 hours and allowed to drain by gravity. The resulting miscella contained 34.9 grams or 64.4% of the available rubber and 62.8 grams or 46.2% of the available resin. When the resulting shrub/miscella mixture remaining in the percolation column is centrifuged, rinsed and recentrifuged so that only 5% miscella remains in the extracted shrub, then 90.1% of the rubber and 64.6% of the resin is removed from the shrub.

The two previous examples show that expression will give a substantial savings in time and solvent requirement over gravity draining and repeated rinses.

EXAMPLE III (Control)

Percolation Extraction Using a 2.5% Resin/Rubber Miscella in a 15% Methyl Alcohol/85% Hexane as a Solvent 5.48 Pounds of guayule shrub were charged to a percolation extraction column. 12.02 Pounds of a 2.5% resin/rubber miscella in 15%/85% ethyl alcohol/hexane solvent at 110° F. were percolated through the shrub bed for 2.5 hours and allowed to drain by gravity. 50.83 grams or 76.2% of the available rubber and 95.71 grams or 56.2% of the available resin were contained in the resulting miscella. Two rinses of 9.0 pounds of 15% methyl alcohol/25% hexane were each percolated through the shrub bed for 0.5 hours and allowed to drain by gravity. After these rinses, 65.23 grams or 97.8% of the available rubber and 142.0 grams or 83.4% of the available resin were removed from the shrub.

EXAMPLE IV

Percolation Extraction Using a 2.5% Resin/Rubber Miscella in a 15% Methyl Alcohol/85% Hexane Solvent Incorporating an Expression or Squeezing Step 5.48 Pounds of guayule shrub were charged to a percolation extraction column. 120.02 Pounds of a 2.5% resin/rubber miscella in a 15% methyl alcohol/85% hexane solvent at 110° F. were percolated through the shrub bed for 2.5 hours and allowed to drain by gravity. 50.83 Grams or 76.2% of the available rubber and 95.71 grams or 56.2% of the available resin were contained in the resulting miscella. When the resulting shrub/miscella mixture remaining in the percolation extraction column is centrifuged or squeezed so that only 5% miscella remains in the extracted shrub then 95.0% of the rubber and 76.9% of the resin is removed.

Examples III and IV show that expression will give a substantial savings in time and solvent requirements over using gravity draining and repeated rinses.

EXAMPLE V

Two-Step Bottle Immersion Extraction Using MeOH Then MeOH/Pentane Azeotrope

1st Step

45 Grams of double flaked guayule shrub and 314.3 grams of MeOH were added to a 28 oz. bottle. The bottle was capped and placed in a constant temperature bath at 30° C. After 24 hours the resulting miscella contained 5.6 grams or 95% of the available resin in the shrub.

2nd Step

The deresinated bagasse from the first step was then treated to extract the rubber by immersion in MeOH/pentane azeotrope. This was carried out in a capped bottle at 30° C. After 2 hours, 2.27 grams or 100+ % of the available rubber was in the resulting solution.

This example demonstrates that 2-step immersion extraction using MeOH then MeOH/pentane azeotrope is a viable method for the extraction of resin and rubber from guayule shrub. Expression of the bagasse or multiple rinses may be used to increase the yield or efficiency of either step.

EXAMPLE VI

Two-Step Bottle Immersion Extraction Using Acetone-Acetone/Pentane Azeotrope

1st Step

45 Grams of double flaked guayule shrub and 313 grams of acetone were added to a 28 oz. bottle. The bottle was capped and placed in a constant temperature bath at 30° C. After 24 hours the resulting miscella contained 3.8 grams or 98.3% of the available in the shrub.

2nd Step

The deresinated bagasse from the first step was then treated to extract the rubber by immersion in acetone/pentane azeotrope. This was carried out in a capped bottle at 30° C. After 2 hours 3.72 grams or 98% of the available rubber was contained in the resulting miscella.

The previous examples (V and VI) show that 2-step immersion extraction using acetone, then acetone/pentane azeotrope is a viable method for extraction of resin and rubber from guayule shrub. Expression of bagasse or multiple rinses may be used to increase the yield or efficiency of either step.

While in accordance with patent statutes, a best mode and preferred embodiment has been set forth, the scope of the present invention is measured by the scope of the attached claims.

We claim:

1. A process for extracting resin and rubber from guayule plants, comprising the steps of:
    adding a portion of a recycled miscella monophase solvent system to prepared guayule plants containing resin and rubber therein, said miscella monophase solvent system containing from about 50% to about 95% by weight of a hydrocarbon solvent and from about 5% to about 50% by weight of a polar solvent, wherein said hydrocarbon solvent is selected from the group consisting of an alkane having from 4 to 9 carbon atoms, a cycloalkane having from 5 to 10 carbon atoms, an aromatic or an alkyl substituted aromatic having from 6 to 12 carbon atoms, and combinations thereof, wherein said polar solvent is selected from the group consisting of an alcohol having from 1 to 8 carbon atoms, an ester having from 3 to 8 carbon atoms, a ketone having from 2 to 8 carbon atoms, an ether having from 2 to 8 carbon atoms, and combinations thereof, and wherein the amount of recycled miscella is at least 70% by weight,
    simultaneously and continuously extracting resin and rubber from said guayuale plants, and
    conducting at least one expression on said guayule plants.

2. A process according to claim 1, wherein said miscella monophase solvent system is obtained from at least resin extraction of said guayule plants.

3. A process according to claim 2, including rinsing said expressed plants with a fresh monophase solvent, said fresh monophase solvent containing from about 50% to about 95% by weight of a hydrocarbon solvent and from about 5% to about 50% by weight of a polar solvent, said hydrocarbon solvent selected from a group consisting of an alkane having from 4 to 9 carbon atoms, cycloalkane having from 5 to 10 carbon atoms, an aromatic or an alkyl substituted aromatic having from 6 to 12 carbon atoms and combinations thereof, wherein said polar solvent is selected from the group consisting of an alcohol having from 1 to 8 carbon atoms, an ester having from 3 to 8 carbon atoms, a ketone having from 2 to 8 carbon atoms, an ether having from 2 to 8 carbon atoms, and combinations thereof.

4. A process according to claim 3, including conducting a second expression on said rinsed guayule plants, wherein the amount of said hydrocarbon solvent is from about 60% to about 85% by weight and wherein the amount of said polar solvent is from about 15% to about 40% by weight.

5. A process according to claim 3, wherein said polar solvent is methyl alcohol and wherein said hydrocarbon solvent is hexane or pentane.

6. A process according to claim 3, wherein at least 90% by weight of said miscella is recycled to said guayule plants.

7. A process according to claim 6, wherein said polar solvent is acetone, and wherein said hydrocarbon solvent is pentane.

8. A process according to claim 2, wherein said process is a one-step process.

9. A process according to claim 7, wherein said process is a one-step process.

* * * * *